(12) United States Patent
Amuduri et al.

(10) Patent No.: US 11,205,312 B2
(45) Date of Patent: Dec. 21, 2021

(54) APPLYING IMAGE ANALYTICS AND MACHINE LEARNING TO LOCK SYSTEMS IN HOTELS

(71) Applicant: Carrier Corporation, Palm Beach Gardens, FL (US)

(72) Inventors: Santhosh Amuduri, Telangana (IN); Ramesh Lingala, Telangana (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/057,129

(22) PCT Filed: Jul. 10, 2019

(86) PCT No.: PCT/US2019/041135
§ 371 (c)(1),
(2) Date: Nov. 20, 2020

(87) PCT Pub. No.: WO2020/014311
PCT Pub. Date: Jan. 16, 2020

(65) Prior Publication Data
US 2021/0201609 A1 Jul. 1, 2021

(30) Foreign Application Priority Data

Jul. 10, 2018 (IN) .............................. 201811025760

(51) Int. Cl.
*G07C 9/00* (2020.01)
*G07C 9/25* (2020.01)
(Continued)

(52) U.S. Cl.
CPC ..... *G07C 9/00563* (2013.01); *G06K 9/00268* (2013.01); *G06K 9/00288* (2013.01);
(Continued)

(58) Field of Classification Search
None
See application file for complete search history.

(56) References Cited

U.S. PATENT DOCUMENTS 7,110,580 B2 9/2006 Bostrom
9,058,025 B2 6/2015 Huang
(Continued)

FOREIGN PATENT DOCUMENTS

CN 104821022 A 8/2015
CN 204791242 U 11/2015
(Continued)

OTHER PUBLICATIONS

International Search Report and Written Opinion for International Application No. PCT/US2019/041135, International Filing Date: Jul. 10, 2019; dated Oct. 17, 2019; 20 pages.

*Primary Examiner* — Carlos Garcia
(74) *Attorney, Agent, or Firm* — Cantor Colburn LLP (57) ABSTRACT

A method of using image analytics and machine learning in a lock system includes receiving data describing access actions that are performed at an access control device based at least in part on a credential. The data includes, for each access action, a description of the access action, a timestamp, and an image of a person presenting the credential. The data is analysed to identify patterns of access. Facial characteristics of the person presenting the credential are identified. The credential is associated with the facial characteristics. It is detected, based at least in part on facial recognition and the facial characteristics, that the person is proximate to the access control device. An access action is performed at the access control device based on the detecting and the patterns of access, where the facial recognition is used in place of the credential to provide authorization to perform the access action.

18 Claims, 5 Drawing Sheets

(51) Int. Cl.
*G07C 9/23* (2020.01)
*G06K 9/00* (2006.01)

(52) U.S. Cl.
CPC ............... *G07C 9/23* (2020.01); *G07C 9/253* (2020.01); *G07C 2209/63* (2013.01)

(56) References Cited

U.S. PATENT DOCUMENTS

| | | |
|---|---|---|
| 9,235,943 B2 | 1/2016 | Scalisi |
| 9,652,917 B2 | 5/2017 | Johnson et al. |
| 9,822,553 B1 | 11/2017 | Ho et al. |
| 9,888,216 B2 | 2/2018 | Scalisi et al. |
| 2002/0191817 A1 | 12/2002 | Sato et al. |
| 2004/0046641 A1 | 3/2004 | Junqua et al. |
| 2014/0240504 A1 | 8/2014 | Cho |
| 2014/0294255 A1 | 10/2014 | Kammer et al. |
| 2015/0326570 A1* | 11/2015 | Publicover ............ H04N 5/247 726/4 |

FOREIGN PATENT DOCUMENTS

| | | |
|---|---|---|
| CN | 205450596 U | 8/2016 |
| CN | 106203647 A | 12/2016 |
| CN | 106327627 A | 1/2017 |
| CN | 205910753 U | 1/2017 |
| CN | 107424085 A | 12/2017 |
| CN | 107480438 A | 12/2017 |
| CN | 104573457 B | 2/2018 |

* cited by examiner

APPLYING IMAGE ANALYTICS AND MACHINE LEARNING TO LOCK SYSTEMS IN HOTELS

CROSS REFERENCE TO RELATED APPLICATIONS

This application is a National Stage application of PCT/US2019/041135, filed Jul. 10, 2019, which claims the benefit of Indian Provisional Patent Application No. 201811025760, filed Jul. 10, 2018, both of which are incorporated by reference in their entirety herein.

BACKGROUND

The subject matter disclosed herein generally relates to the field of access control systems, and more particularly to an apparatus and method for applying image analytics and machine learning to lock systems in hotels.

Hotel customers may exit and enter their hotel rooms several times a day, and each time that they enter their room they are required to provide a credential to unlock a lock on the room door. Hotel customers may also be required to provide a credential when they enter other restricted areas of the hotel such as a health club or parking garage or entry doors or an elevator car. The credential may be located on an access card provided by the hotel or on a mobile device of the user, both of which the hotel customer puts proximate to the lock (e.g., in a card reader or other short range reader) to unlock a lock on a restricted area. Both the access card and the mobile device require the hotel customer to take an action to unlock the lock, and they both require the hotel customer to remember to bring their access card or mobile device when they exit their hotel room.

BRIEF SUMMARY

According to an embodiment, a method of using image analytics and machine learning in a lock system is provided. The method includes receiving data describing access actions that are performed at an access control device based at least in part on a credential. The data includes, for each access action, a description of the access action, a timestamp, and an image of a person presenting the credential. The data is analysed to identify patterns of access. Facial characteristics of the person presenting the credential are identified. The credential is associated with the facial characteristics. It is detected, based at least in part on facial recognition and the facial characteristics, that the person is proximate to the access control device. An access action is performed at the access control device based on the detecting and the patterns of access, where the facial recognition is used in place of the credential to provide authorization to perform the access action.

In addition to one or more of the features described above or below, or as an alternative, further embodiments of the method may include that the patterns include a time of day, and the performing is further based on a current time of day being within a threshold of the time of day in the patterns.

In addition to one or more of the features described above or below, or as an alternative, further embodiments of the method may include that the patterns include a day of week, and the performing is further based on a current day of week being within a threshold of the day of week of the patterns.

In addition to one or more of the features described above or below, or as an alternative, further embodiments of the method may include that facial characteristics of a plurality of people are identified as presenting the credential and the credential is associated with the plurality of people.

In addition to one or more of the features described above or below, or as an alternative, further embodiments of the method may include the access action being an unlock or lock.

In addition to one or more of the features described above or below, or as an alternative, further embodiments of the method may include that the access action is enter security mode or enter office mode.

In addition to one or more of the features described above or below, or as an alternative, further embodiments of the method may include that additional access actions are performed subsequent to the performing as long as a confidence level of the associating is above a threshold.

In addition to one or more of the features described above or below, or as an alternative, further embodiments of the method may include that the facial characteristics are updated based on images of the person received after the associating.

According to another embodiment, a system is configured to use image analytics and machine learning in a lock system. The system includes a processor and a memory having computer-executable instructions that, when executed by the processor, cause the processor to perform operations. The operations include receiving data describing access actions, the access actions performed at an access control device based at least in part on a credential. The data includes, for each access action, a description of the access action, a timestamp, and an image of a person presenting the credential. The data is analysed to identify patterns of access. Facial characteristics of the person presenting the credential are identified. The credential is associated with the facial characteristic. It is detected, based at least in part on facial recognition and the facial characteristics, that the person is proximate to the access control device. The access action is performed at the access control device based on the detecting and the patterns of access, and facial recognition is used in place of the credential to provide authorization to perform the access action.

In addition to one or more of the features described above or below, or as an alternative, further embodiments of the system may include that the patterns include a time of day, and the performing is further based on a current time of day being within a threshold of the time of day in the patterns.

In addition to one or more of the features described above or below, or as an alternative, further embodiments of the system may include that the patterns include a day of week, and the performing is further based on a current day of week being within a threshold of the day of week of the patterns.

In addition to one or more of the features described above or below, or as an alternative, further embodiments of the system may include that facial characteristics of a plurality of people are identified as presenting the credential and the credential is associated with the plurality of people.

In addition to one or more of the features described above or below, or as an alternative, further embodiments of the system may include the access action being an unlock or lock.

In addition to one or more of the features described above or below, or as an alternative, further embodiments of the system may include that the access action is enter security mode or enter office mode.

In addition to one or more of the features described above or below, or as an alternative, further embodiments of the system may include that additional access actions are performed subsequent to the performing as long as a confidence level of the associating is above a threshold.

In addition to one or more of the features described above or below, or as an alternative, further embodiments of the system may include that the facial characteristics are updated based on images of the person received after the associating.

According to an embodiment, a method of using image analytics and machine learning in a two-step authentication system is provided. The method includes receiving data describing access actions that were performed at an access control device based at least in part on a credential, The data includes, for each access action, a description of the access action, a timestamp, and an image of an identifier of a person presenting the credential. The data is analyzed to identify patterns of access. Characteristics of the identifier of a person presenting the credential are identified, and the credential is associated with the characteristics of the identifier. It is detected, based at least in part on image recognition and the characteristics of the identifier, that the person is proximate to the access control device. Based at least in part on the detecting, a personal identification number (PIN) entered at a keyboard of the access control device is validated with an expected PIN of the person. An access action is performed at the access control device based on the expected PIN of the person being the same as the PIN entered at the keyboard of the access control device.

In addition to one or more of the features described above or below, or as an alternative, further embodiments of the method may include that the characteristics include facial characteristics.

In addition to one or more of the features described above or below, or as an alternative, further embodiments of the method may include that the characteristics include license plate characteristics.

In addition to one or more of the features described above or below, or as an alternative, further embodiments of the method may include the access action being an unlock.

Technical effects of embodiments of the present disclosure include the ability to use facial features of a user in place of a credential that must be swiped or presented by the user. Additional technical effects include the ability to eliminate two factor authentication.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In accordance with an embodiment, facial recognition can be used in place of a credential to unlock a lock of an access control device, such as a lock on a hotel room door (or any other door that a person returns to often such in an office door, a building entrance door, an apartment door, a home door, etc.). Image analytics and machine learning are dynamically applied to accesses by a hotel customer when the hotel customer is using a credential located, for example, on an access card provided by the hotel or on a mobile device of the user. Once a pattern of access to the hotel room by the hotel customer is established, the lock on the hotel room door can be automatically unlocked when the hotel customer is detected by a camera located proximate to or in the access control device on the hotel room door of the hotel customer. As long as a confidence that the person requesting access to the hotel room is the hotel customer remains over a specified threshold level, the hotel customer can continue to gain access to the hotel room based on facial recognition and without having to show a credential. In this manner, the picture, or image, of the hotel customer that is taken by the camera is used in place of the credential.

In accordance with an embodiment, machine learning is used to determine when the lock can be unlocked based on a picture of the hotel customer captured by the camera. In accordance with an embodiment, the picture of the person is not prior associated with their credential in the access control system. The system dynamically learns the access pattern and the person's face and once it is learned, facial recognition can be used. Accesses to the door can be tracked while an access pattern is being established. In an embodiment, when an access event occurs using a credential, the camera takes a picture of the hotel customer performing the access. In an embodiment, the access control device that contains the lock informs the camera to take the picture using a short range wireless communication method such as, but not limited to Bluetooth Low Energy (BTLE), ZigBee, and/or other wireless method. The camera can be integrated into the lock or separate from the lock (e.g., an already existing security camera). A record of the access event (e.g., timestamp and access event) and the corresponding picture of the hotel customer is sent to a server for analysis/machine learning. Records can be captured continuously by the camera and machine learning applied to the record. Once a pattern of the same person being identified by the image analytics software (e.g., facial recognition software) and optionally being granted access at the same time period for a predefined successive number of times is identified, the camera can be enabled to grant authorization automatically and to inform the lock to open without requiring presentation of a credential. If a predefined number of failures are encountered successively within that time period, causing the confidence level fall below a threshold level that the picture taken by the camera can be used in place of the credential, then the camera no longer grants authorization to the hotel customer. In this case, the lock has to be authenticated by the hotel customer manually using a credential in an access card or mobile device until a new pattern of accesses is established and identified.

Examples are described herein with respect to hotels, however embodiments can be used in any embodiment where access is controlled using an access control device. For example, an embodiment can be used in a home environment. A pattern of children coming home from school every day around 3:00 PM can be established and the camera can analyze the background images to determine whether to unlock the door automatically. Rules for unlocking the door based on image analytics can be applied. For example, the system may unlock the door only if one child, the one recognized by facial recognition as being expected in that time frame is in the picture. In another embodiment, the system may unlock the door as long as one of the children in the field of view of the camera is recognized by facial recognition. In this manner, the first example does not unlock the door if the child brings friends home, and the second example does unlock the door if the child brings friends home. In an embodiment, if the previous pattern is that the child unlocks the lock every weekday at 3 PM, then a high confidence can be associated with a request from the child to unlock the lock at 3 PM on the next weekday, and a lower confidence can be associated with a request from the child to unlock the lock at 6 PM on the next week day or on a weekend day.

One or more embodiments described herein can be utilized to eliminate two-factor authentication. With two-factor authentication, a person typically has to present/swipe a credential using for example, a key card and then enter a personal identification number (PIN) into a keypad to cause the lock to unlock. In an embodiment, by applying analytics using a camera to automate the first level authentication, the swiping of the key card is eliminated. In an embodiment, details provided by the person such as car license plate or physical key card number (or name) can be identified by the camera. At a parking space or room, the camera can be configured to look for the car license plate or the physical key card number (or name) to understand physical presence of the person, to fetch the corresponding expected PIN from the server. The lock unlocks when a PIN entered by the person matches the expected PIN fetched by the camera.

Figure 1:
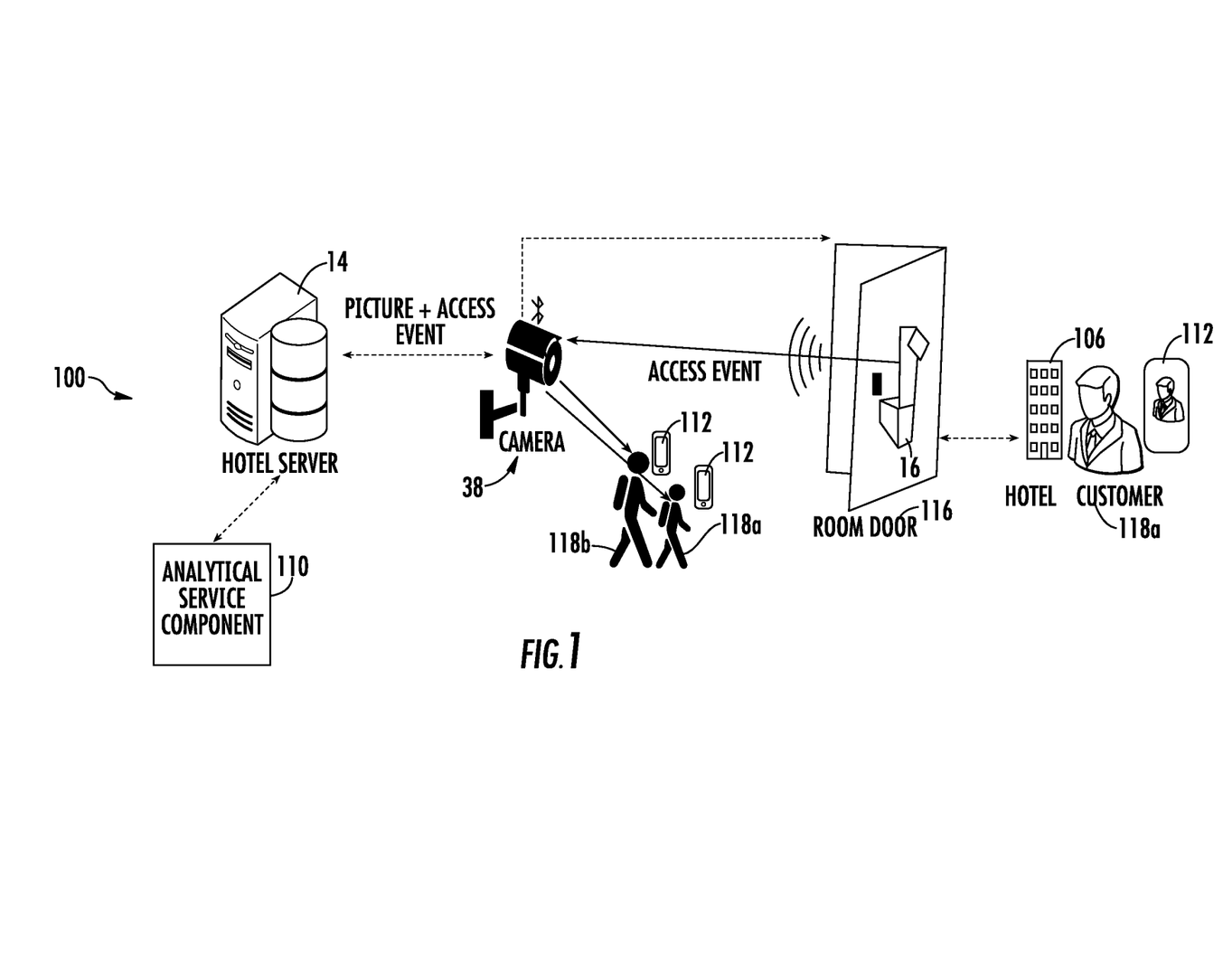
FIG. 1 illustrates a general schematic system diagram of a system that applies image analytics and machine learning to lock systems, in accordance with an embodiment of the disclosure.

Turning now to FIG. 1, a general schematic system diagram of a system 100 that applies image analytics and machine learning to lock systems is generally shown in accordance with an embodiment of the disclosure. The system 100 generally includes a server 14, an access control device 16, a user device 106, an analytical service component 110, and a camera 38. Also shown in FIG. 1 are pictures 112, a room door 116, and hotel customers 118. It should be appreciated that, although particular systems are separately defined in the schematic block diagrams, each or any of the systems may be otherwise combined or separated via hardware and/or software. For example, computer instructions to implement the analytical service component 110 can be located on and executed by the server 14. The computer instructions to implement the analytical service component 110 can also be located on mobile phone 112, camera 38, and/or access control device 16.

In an embodiment, the access control device 16 includes a lock and controls access to a hotel room through room door 116. It should be appreciated that the access control system 100 may include any number of doors and rooms. Further, there may be multiple doors and access control devices 16 for each room. As shown in FIG. 1, the access control device 16 communicates access events to the camera 38 and can receive requests from the camera 38 to perform an access event such as lock or unlock. In embodiment, the access events are sent to the hotel server 14 by the access control device 16 which sends them to the camera 38. In an embodiment, an access event can also include entering a security mode and/or an office mode. In an embodiment, the camera 38 takes a picture 112 of a hotel customer requesting the access event when the access control device 16 communicates an access event to the camera 38. In another embodiment, the camera is taking an image stream and a timestamp of the access event and the image stream are used to select a picture of the hotel customer making the access request. The picture can be selected for example, based on a time stamp captured by the camera 38 or based on an access time stamp sent to the camera 38 by the access control device 16. Alternatively, the camera is streaming video to the hotel server 14 and the time stamp is sent from access control device 16 to the hotel server 14; and the hotel server 14 selects the image based on the timestamp from the recorded video. In an embodiment, the image stream is initiated as long as the camera 38 detects nearby motion. The camera 38 shown in FIG. 1 can also request an access event (e.g., unlock a lock on the room door 116) for hotel customer 118a and not for hotel customer 118b, based for example on previously detected patterns and contents of the pictures 112 taken by the camera 38. In an embodiment where the analytics are running on the hotel server 14 and are processing a continuous video stream looking for faces, the hotel server 14 can request an access event for particular customers.

In an embodiment, the camera 38 is a camera sensor with low power that is very small in size such as, but not limited to an Ov7251 global shutter image sensor from OmniVision; and a visual sensor from Emza Visual Sense. In an embodiment, the camera sensor is located within the access control device 16 and communicates to the access control device 16 via a short-range wireless communication method and/or a near field communication method. In an embodiment, a field of view of the camera is focused on an expected location of user requesting an access action (e.g., swiping a key card to request the lock to unlock). In an embodiment, camera 38 communicates with the server 14 via any short or long-range wireless communication method known in the art over wired or wireless networks such as, but not limited to the Internet, a local area network (LAN), and a wide area network (WAN).

For a selected period of time (e.g., a period of stay of a hotel customer at a hotel) the user device 106 associated with a hotel customer may be granted access to one or more access control devices 16 (e.g., the door lock on a hotel room assigned to the hotel customer). When a person checks in to the hotel, their user device 106 is granted access to a room. There may be one or more user devices 106 assigned to a hotel room (e.g., one for each occupant of the room), thus embodiments disclosed herein may apply to multiple user devices 106 per room. A hotel customer uses the user device 106 to unlock and/or lock the access control device 16 operably connected to their assigned room. The state of the access control device 16 can be changed from locked to unlocked through an access request from the user device 106 being sent to the access control device 16 via a short-range wireless communication interface such as BTLE and/or via a near field communication interface (NFC).

The user device 106 may store credentials to unlock and/or lock the access control device 16. Some credentials may be used for multiple access control devices 16 if there are multiple access control devices 16 for a single assigned room or the hotel customer is assigned access to multiple rooms. For example, an access control device 16 operably connected to a hotel room and an access control device 16 operably connected to a hotel pool or other location within the hotel premises (e.g., gym, restaurant, etc.) may respond to the same credential. Other credentials may be specific to a single access control device 16.

The user device 106 may be a physical key card and/or a mobile device. The user device 106 may transmit an access request to the access control device 16 via a short-range radio transmission interface when the user device 106 is placed proximate to (i.e., within the range of the short-range radio transmission interface) the access control device 16. Alternatively, when the user device 106 is a key card, an access request can be transmitted to the access control device 16 by the user device 106 being inserted into or presented to the access control device 16 for the access control device 16 to read the key card (e.g., an encoded magnetic stripe, RFID, smart chip card, etc.). The physical key card is capable of being encoded with card data, such as, for example, a magnetic stripe or RFID chip. The data may include credentials to grant access to a specific access control device 16. For example, for a period of stay of the hotel customer, the user device 106 may be granted access to a specific access control device 16. In an embodiment, the user device 106 is a wireless capable handheld device such as a smartphone or tablet or smart watch.

The access control device 16 may be a wireless-capable, restricted-access, or restricted-use device such as a wireless lock, access control reader for building entry, and other restricted-use machine. The user device 106 submits credentials to the access control device 16, thereby selectively permitting a user to access or activate functions of the access control device 16. A user device 106 may, for example, submit a credential to an electromechanical lock to unlock it, and thereby gain access to a room at the hotel.

In an embodiment, the access control device 16 is configured to generate records each time that a lock is locked (or closed) and each time that the lock is unlocked (or opened). In an embodiment, each record includes a picture 112 taken by the camera 38 at the time of the access event as well as access event information such as, but not limited to: a timestamp, an indicator of a state of locked or unlocked, and/or an identifier of a location (e.g., room number) of the access control device 16. When a record indicates that the lock was unlocked, the record can also include an identifier of the credential used when sending the access request. In an embodiment, the records are transmitted from the access control device 16 to the server 14 via the camera 38. In an embodiment, the records are transmitted to the server 14 and/or camera 38 periodically at a selected interval. In another embodiment, a record is transmitted to the server 14 and/or camera after each access event.

As shown in FIG. 1, the server 14 transmits the records to the analytical service component 110 via any short or long-range wireless communication method known in the art over wired or wireless networks such as, but not limited to the Internet, a local area network (LAN), and a wide area network (WAN). The analytical service component 110 performs analysis on the records in an attempt to identify patterns of access events by the hotel customer 118 at the access control device 16. Once a pattern of successful access events by the same person (as determined for example, by applying facial recognition to the pictures in the records) using the credential has been identified, then the hotel customer 118 can be provided access based on the camera 38 recognizing the hotel customer 118 proximate to the access control device 16 within an expected time frame.

In an embodiment, the analytical server component 110 is an application that is executing on the server 14. In another, embodiment the analytical server component 110 is executing on a mobile device. In another embodiment, the analytical server component 110 is executing on a processor remote from the server 14.

Figure 2:
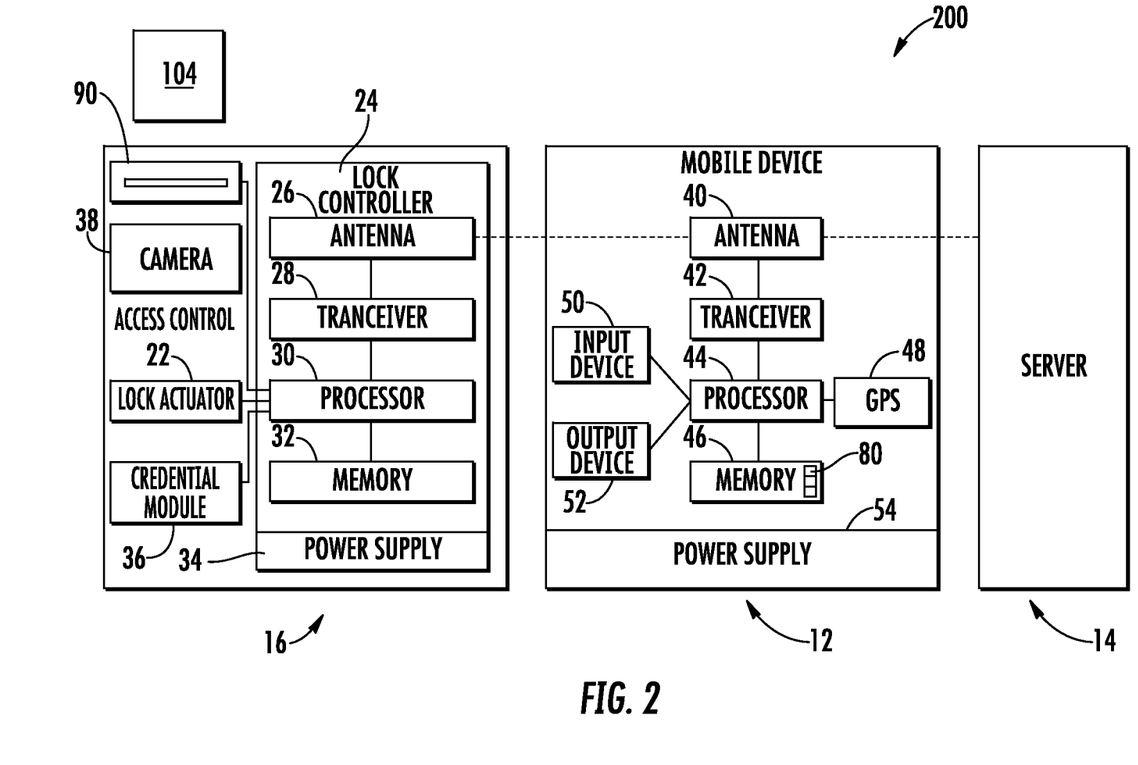
FIG. 2 illustrates a block diagram of an access control device, mobile device and server of the access control system of FIG. 1, in accordance with an embodiment of the disclosure.

With reference to FIG. 2, a block diagram of an example electronic lock system 200 includes the access control device 16, the mobile device 12 of the hotel customer (e.g., user device 106 of FIG. 1), and the server 14. The access control device 16 generally includes a lock actuator 22, a lock controller 24, a lock antenna 26, a lock transceiver 28, a lock processor 30, a lock memory 32, a lock power supply 34, a camera 38, a lock card reader 90 and a credential module 36. The access control device 16 may have essentially two readers, one reader 90 to read a physical key card 104 (e.g., and the credential module 36 to communicate with the mobile device 12 via the lock processor 30 and the transceiver 28 and antenna 26. The access control device 16 is responsive to credentials from the mobile device 12, and may, for example, be the lock of a turnstile or a door lock. Although the present disclosure focuses primarily on credentials for access control, it should be appreciated that other systems wherein credentials are transmitted from a mobile device to an access control device so as to identify the user to an online system or validate user access rights or permissions in an offline system will benefit herefrom.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. In this manner, a lock state of the access control device 16 changes from one state to another state. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, Zigbee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options and the lock audit records. The lock audit records described herein may be a unified audit trail that includes events initiated by accessing the lock via a mobile device 12 or key card 104. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna 26. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12.

Figure 3:
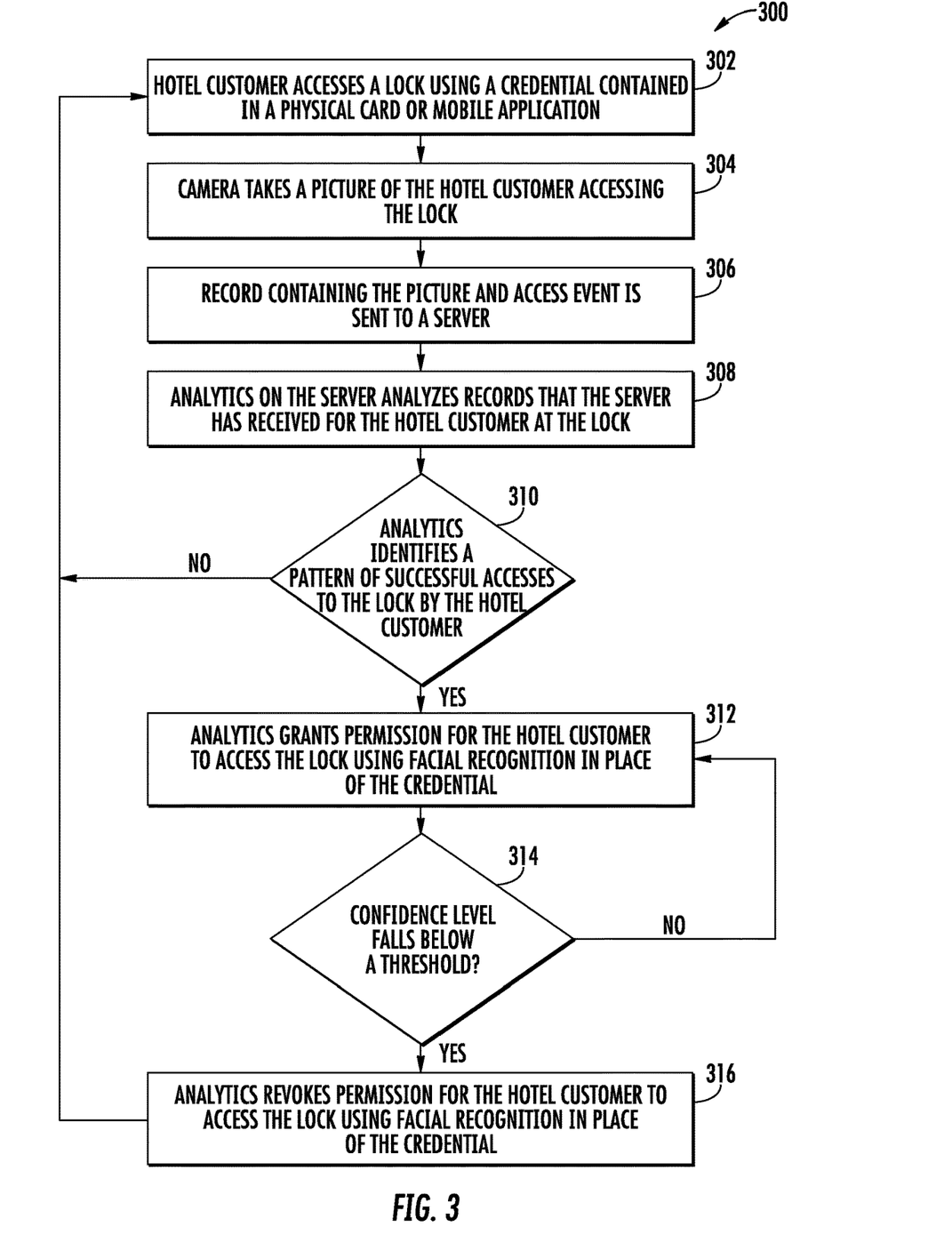
FIG. 3 is a flow diagram illustrating a method of applying image analytics and machine learning to lock systems, in accordance with an embodiment of the disclosure.

Turning now to FIG. 3, a flow diagram 300 illustrating a method of applying image analytics and machine learning to a locking system is generally shown, in accordance with an embodiment of the disclosure. The processing shown in FIG. 3 can be performed by all or a subset of system 100 shown in FIG. 1. At block 302, a hotel customer accesses a lock at an access control device, such as access control device 16 of FIG. 1, using a credential contained in a physical key card or a mobile application. In an embodiment the credential is assigned to the hotel customer by the hotel and allows the hotel customer to perform selected access events at selected access control devices. At block 304, the access control device requests a camera, such as camera 38 of FIG. 1, to take a picture of the person accessing the lock using the credential. In an alternate embodiment, where the camera is continuously taking pictures, the access control device associates a picture taken by the camera with the person based on a timestamp. At block 306, information about the access event is sent to the camera, and the camera creates a record that includes the information about the access event and the picture corresponding to the access event. The camera sends the record to a server, such as hotel server 14 of FIG. 1. In this manner, the system correlates faces of hotel customers (and possibly their family and guests) with their assigned credentials. In an embodiment, the access event includes a timestamp that indicates when the access event occurred as well as a description of the type of access event that occurred (e.g., unlock).

At block 308, analytics, such as analytics service component 110, uses machine learning to analyze the records corresponding to the access control device and the credential. In an embodiment, the analysis includes looking for patterns in the time frame, the type of access action, and the person performing the access action. The type of access action can include, but is not limited to: lock, unlock, set security mode, and/or set office mode. The time frame can include, but is not limited to: time of day, day of week, week of month, and/or day of month. In an embodiment, the pictures included in the records are analyzed using facial recognition software that includes algorithms to identify facial features by extracting landmarks, or features, from an image of the person's face. For example, an algorithm may analyze the relative position, size, and/or shape of the eyes, nose, cheekbones, and jaw. A probe image is then compared with the face data. The facial recognition software can be used for later recognition by the camera of the hotel customer, or person(s) that they have authorized to use their credential. In an embodiment, until an access pattern that includes the same person (based on facial recognition of contents of the pictures) successfully performing the same access action (optionally in the same time frame) is identified at block 310, processing continues by looping back to block 302.

In an embodiment, once an access pattern that includes the same person (based on facial recognition of contents of the pictures) successfully performing the same access action is identified at block 310, then block 312 is performed and the analytics grants permission for the hotel customer to perform the access action based on the camera recognizing the hotel customer in its field of view. In an embodiment, recognition of the hotel customer's face in the field of view of the camera is used in place of the credential. In an embodiment, people other than the hotel customer who was assigned the credential are also granted permission to perform the access action based on the analysis. In an embodiment, it can take longer to establish a pattern at block 310 if multiple people share a credential (e.g., key card). See FIG. 5 below for an embodiment of processing performed at block 312 when the access action requires two-factor authentication.

At block 314 it is determined whether a confidence level of the association between the credential and the customer's face has fallen below a specified threshold. The threshold can be set based on factors such as, but not limited to the level of security required (e.g., hotel room may have a higher required security level than a hotel gym), and a tolerance level of the hotel customer for a security breach. In an embodiment, the confidence level can remain high if the hotel customer is observed by the camera requesting an access action that is the same as access actions performed in the past by the hotel customer and within the same time frame. In an embodiment, the confidence level can be lowered if a hotel customer is observed by the camera requesting an access action that is different than an access action performed in the past by the hotel customer and/or within a different time frame. In an embodiment, a higher level of confidence can be assigned when the camera has a high level of confidence in the facial recognition results (e.g., have a clear reading of the hotel customer's face) and a lower level of confidence can be applied if the facial recognition results are ambiguous. In an embodiment, the confidence level can be lowered when facial characteristics change rapidly (e.g., a hotel customer shaves off a beard or mustache), and the confidence level may remain the same or close to the same when facial characteristics change more slowly (e.g., the machine learning can adapt when a hotel customer grows a beard and is seen by the camera every few days). The confidence level reflects how sure the system is that the face in the camera matches the credential.

If it is determined at block 314, that the confidence level has fallen below a specified threshold, then block 316 is performed and the analytics revokes permission for the hotel customer to perform the access action using facial recognition in place of the credential. The access action is denied and processing continues at block 302 with the hotel customer accessing the lock using a credential. If it is determined at block 314 that the confidence level has not fallen below a threshold, then processing continues at block 312 and facial recognition is used to allow the hotel customer to perform the access action.

While the above description has described the flow process of FIG. 3 in a particular order, it should be appreciated that unless otherwise specifically required in the attached claims that the ordering of the steps may be varied. In addition, the data flow may be varied. For example block 304 may include a continuous video stream to the server, and at block 306 a timestamp and event code is sent from the access control device to the server and in addition a picture is retrieved from the video stream at the time indicated by the timestamp to use in block 308.

Figure 4:
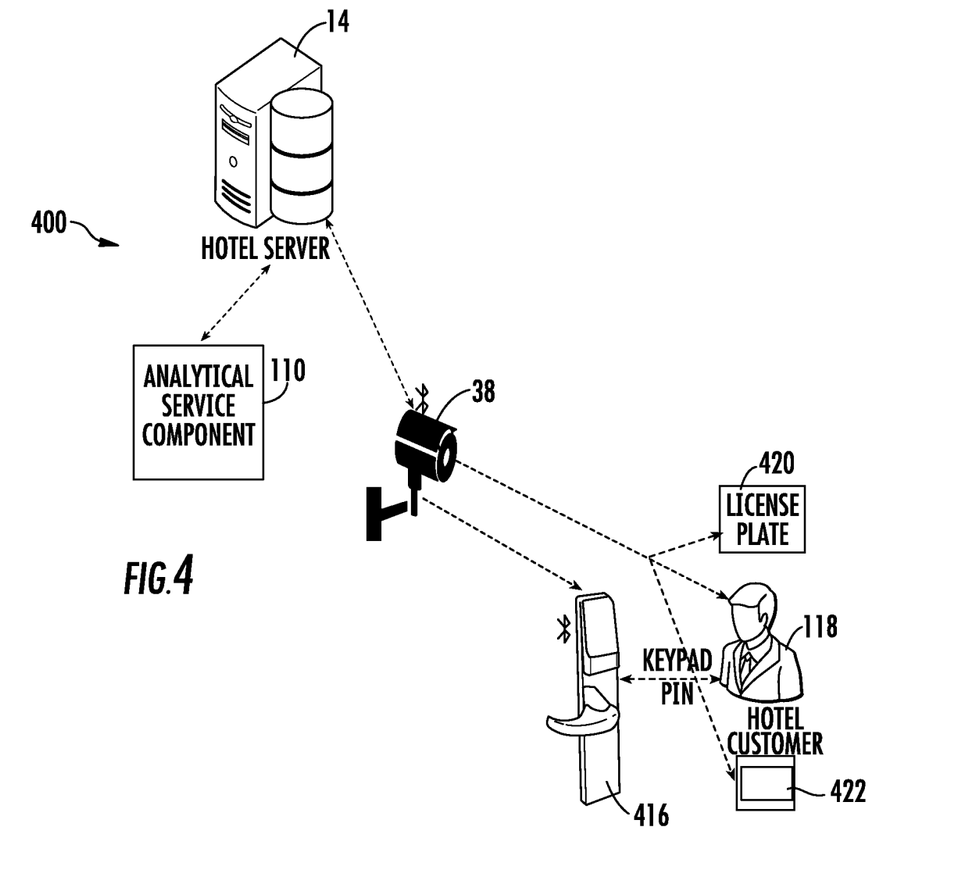
FIG. 4 illustrates a general schematic system diagram of a system that applies image analytics and machine learning to two-factor authentication lock systems, in accordance with an embodiment of the disclosure.

Turning now to FIG. 4, a general schematic system diagram of a system 400 that applies image analytics and machine learning to a two-factor authentication locking system, is generally shown in accordance with an embodiment of the disclosure. The system 400 generally includes a server 14, an access control device 416, an analytical service component 110, and a camera 38. Also shown in FIG. 4 are a license plate 420, a hotel customer 118, and an employee badge 422. Access control device 416 has similar components as access control device 16 of FIGS. 1 and 2, with the addition of a keypad and logic to support two-factor authorization. In an embodiment, the access control device 416 requires both a credential and a PIN in order to allow a hotel customer to perform an access action such as accessing a hotel room or other restricted area. The interaction and communication connections between the server 14, the analytical service component 110, the camera 38, and the access control device 416 are the same as those described above with reference to FIG. 1 with the addition of functionality to support two-factor authorization.

In an embodiment, an additional function performed by the camera 38 to support two-factor authorization includes fetching an expected PIN from the server based on recognizing a hotel customer 118 in the field of view of the camera 38. In an embodiment, the camera 38 (or the server 14) sends the expected PIN to the access control device 416 so that it can verify a PIN entered by the hotel customer 118. In an embodiment, the analytic service component 110 can also perform machine learning that associates a license plate(s) 420 or an employee badge 422 to a credential instead of or in addition, to the face of the hotel customer 118.

Figure 5:
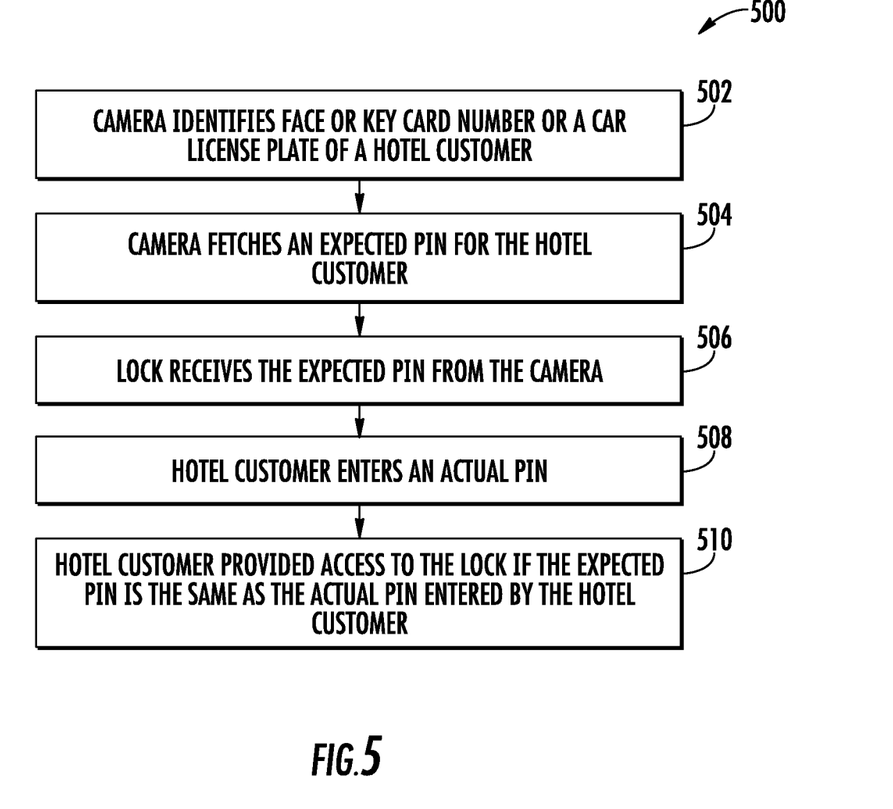
FIG. 5 is a flow diagram illustrating a method of applying image analytics and machine learning to two-factor authentication lock systems, in accordance with an embodiment of the disclosure.

Turning now to FIG. 5, a flow diagram 500 illustrating a method of applying image analytics and machine learning to two-factor authentication locking systems is generally shown, in accordance with an embodiment of the disclosure. The processing shown in FIG. 5 can eliminate the first step of two-factor authentication by not requiring the hotel customer to present a credential via a mobile device or by swiping a key card. In an embodiment, the processing shown in FIG. 5 is performed as part of block 312 of FIG. 3 once the analytics has granted permission for the hotel guest 118 to use facial recognition in place of the credential. At block 502, a camera, such as camera 38 of FIG. 4, identifies the face of a hotel customer in its field of view, and at block 504, the camera fetches an expected PIN for the hotel customer from a server, such as server 14 of FIG. 4. In an alternate embodiment, the camera takes the picture, and the analytic component, such as analytic service component 110 of FIG. 4, identifies the face of the hotel customer and then signals the server to send expected PIN via the camera or straight to the lock.

At block 506, the camera sends the expected PIN to an access control device, such as access control device 416 of FIG. 4. At block 508, the hotel customer enters PIN at a keypad of the access control device. At block 510, the hotel customer is provided access to the lock if the expected pin is the same as the actual pin entered by the hotel customer. In an alternate embodiment, the camera takes the picture, and the analytic component, such as analytic service component 110 of FIG. 4, identifies the face of the hotel customer and then signals the server to send expected PIN via the camera or straight to the lock. In an alternate embodiment, the PIN is entered and sent to the server, and the camera data is sent to the server. In addition, the analytical component determines the face, and the server looks up the expected PIN and compares it with the entered PIN and then sends a signal back to the access control to 'open'.

In an embodiment, the camera 38 can be trained to recognize a car license plate 420 and/or an employee badge 422 of the hotel customer 118 along with or instead of the face of the hotel customer using machine learning techniques as described above. In this embodiment, the license plate 420 and/or the employee badge 422 can be used in place of the credential to identify the hotel customer 118.

Embodiments can be used in commercial domains such as, but not limited to: offices, schools, and bank lockers. Embodiments can also be used in elevator systems. For example, when a hotel customer 118 registers at a hotel his/her picture is taken and a server is updated with picture. Once a pattern of access is detected as described herein, the hotel customer 118 the hotel customer 118 can be granted access to the elevator car based on facial recognition and without having to show a credential.

While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of using image analytics and machine learning in a lock system, the method comprising:
    receiving data describing access actions, the access actions performed at an access control device based at least in part on a credential, and the data comprising, for each access action, a description of the access action, a timestamp, and an image of a person presenting the credential;
    analyzing the data to identify patterns of access, the patterns including a day of week;
    identifying facial characteristics of the person presenting the credential;
    associating the credential with the facial characteristics;
    detecting, based at least in part on facial recognition and the facial characteristics, that the person is proximate to the access control device; and
    performing an access action at the access control device based on the detecting and the patterns of access, wherein the facial recognition is used in place of the credential to provide authorization to perform the access action in response to a current day of the week being within a threshold of the day of week of the patterns.

2. The method of claim 1, wherein the patterns further include a time of day and the performing is further based on a current time of day being within a threshold of the time of day in the patterns.

3. The method of claim 1, wherein facial characteristics of a plurality of people are identified as presenting the credential and the credential is associated with the plurality of people.

4. The method of claim 1, wherein the access action is unlock or lock.

5. The method of claim 1, wherein the access action is enter security mode or enter office mode.

6. The method of claim 1, wherein additional access actions are performed subsequent to the performing as long as a confidence level of the associating is above a threshold.

7. The method of claim 1, wherein the facial characteristics are updated based on images of the person received after the associating.

8. A system configured to use image analytics and machine learning in a lock system, the system comprising:
    a processor; and
    a memory comprising computer-executable instructions that, when executed by the processor, cause the processor to perform operations, the operations comprising:
        receiving data describing access actions, the access actions performed at an access control device based at least in part on a credential, and the data comprising, for each access action, a description of the access action, a timestamp, and an image of a person presenting the credential;
        analyzing the data to identify patterns of access, the patterns including a day of week;
        identifying facial characteristics of the person presenting the credential;
        associating the credential with the facial characteristics;
        detecting, based at least in part on facial recognition and the facial characteristics, that the person is proximate to the access control device; and
        performing an access action at the access control device based on the detecting and the patterns of access, wherein the facial recognition is used in place of the credential to provide authorization to perform the access action in response to a current day of the week being within a threshold of the day of week of the patterns.

9. The system of claim 8, wherein the patterns further include a time of day and the performing is further based on a current time of day being within a threshold of the time of day in the patterns.

10. The system of claim 8, wherein facial characteristics of a plurality of people are identified as presenting the credential and the credential is associated with the plurality of people.

11. The system of claim 8, wherein the access action is unlock or lock.

12. The system of claim 8, wherein the access action is enter security mode or enter office mode.

13. The system of claim 8, wherein additional access actions are performed subsequent to the performing as long as a confidence level of the associating is above a threshold.

14. The system of claim 8, wherein the facial characteristics are updated based on images of the person received after the associating.

15. A method of using image analytics and machine learning in a two-step authentication lock system, the method comprising:
    receiving data describing access actions, the access actions performed at an access control device based at least in part on a credential, and the data comprising, for each access action, a description of the access action, a timestamp, and an image of an identifier of a person presenting the credential;
    analyzing the data to identify patterns of access, the patterns including a day of week;
    identifying characteristics of the identifier of a person presenting the credential;

associating the credential with the characteristics of the identifier;
detecting, based at least in part on image recognition and the characteristics of the identifier, that the person is proximate to the access control device;
based at least in part on the detecting, validating a personal identification number (PIN) entered at a keyboard of the access control device with an expected PIN of the person; and
performing an access action at the access control device based on the expected PIN of the person being the same as the PIN entered at the keyboard of the access control device and in response to a current day of the week being within a threshold of the day of week of the patterns.

16. The method of claim 15, wherein the characteristics include facial characteristics.

17. The method of claim 15, wherein the characteristics include license plate characteristics.

18. The method of claim 15, wherein the access action is unlock.

* * * * *